(12) United States Patent
Qing et al.

(10) Patent No.: US 11,590,897 B2
(45) Date of Patent: Feb. 28, 2023

(54) STEP APPARATUS FOR VEHICLE AND VEHICLE

(71) Applicant: T-MAX (HANGZHOU) TECHNOLOGY CO., LTD., Zhejiang (CN)

(72) Inventors: Zhaobo Qing, Zhejiang (CN); Huizhong Yang, Zhejiang (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 85 days.

(21) Appl. No.: 17/317,611

(22) Filed: May 11, 2021

(65) Prior Publication Data

US 2021/0347304 A1     Nov. 11, 2021

(30) Foreign Application Priority Data

May 11, 2020   (CN) .......................... 202010393602.3
May 11, 2020   (CN) .......................... 202020770820.X

(51) Int. Cl.
    *B60R 3/02*     (2006.01)
(52) U.S. Cl.
    CPC ..................................... *B60R 3/02* (2013.01)
(58) Field of Classification Search
    CPC ..................................................... B60R 3/02
    See application file for complete search history.

(56) References Cited

U.S. PATENT DOCUMENTS

| | | | |
|---|---|---|---|
| 7,591 | A | 8/1850 | Burdett |
| 634,385 | A | 10/1899 | Wolfe et al. |
| 724,155 | A | 3/1903 | Besse |
| 752,031 | A | 2/1904 | Chadwick |
| 817,224 | A | 4/1906 | Clifford |
| 955,658 | A | 4/1910 | Mitchell et al. |
| 1,063,643 | A | 6/1913 | Blake et al. |
| 1,169,140 | A | 1/1916 | Fassett et al. |
| 1,176,538 | A | 3/1916 | Warner |
| 1,182,169 | A | 5/1916 | Hansen |
| 1,222,127 | A | 4/1917 | Perri |
| 1,239,892 | A | 9/1917 | Dunderdale |
| 1,242,828 | A | 10/1917 | Lyle |
| 1,250,604 | A | 12/1917 | Lorenc |

(Continued)

FOREIGN PATENT DOCUMENTS

| | | |
|---|---|---|
| CA | 1021826 | 11/1977 |
| CA | 2082177 | 5/1994 |

(Continued)

OTHER PUBLICATIONS

International Search Report and Written Opinion of the International Searching Authority for PCT International Application No. PCT/CN2015/097930 dated May 10, 2016.

(Continued)

*Primary Examiner* — Bryan A Evans
(74) *Attorney, Agent, or Firm* — Perkins Coie LLP

(57) ABSTRACT

A step apparatus for a vehicle and a vehicle are provided. The step apparatus for the vehicle includes a step; a lifting device connected to the step and configured to be unfolded and folded to adjust a height of the step; and a driver connected to the lifting device and configured to drive the lifting device to be unfolded and folded.

22 Claims, 11 Drawing Sheets

(56) References Cited

U.S. PATENT DOCUMENTS

| | | |
|---|---|---|
| 1,268,335 A | 6/1918 | Fairchild |
| 1,364,697 A | 1/1921 | Branch |
| 1,437,648 A | 12/1922 | Gore |
| 1,449,031 A | 3/1923 | Blake |
| 1,471,972 A | 10/1923 | Miller |
| 1,509,235 A | 9/1924 | Giuliani |
| 1,621,479 A | 3/1927 | Cleveland et al. |
| 1,755,942 A | 4/1930 | Woolson |
| 1,800,162 A | 4/1931 | Stroud |
| 2,029,745 A | 2/1936 | Stiner |
| 2,041,640 A | 5/1936 | Goss |
| 2,118,557 A | 5/1938 | Hamilton |
| 2,122,040 A | 6/1938 | Machovec |
| 2,125,085 A | 7/1938 | Pool |
| 2,197,266 A | 4/1940 | Fredell |
| 2,209,576 A | 7/1940 | McDonald |
| 2,246,986 A | 6/1941 | Pellegrini |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,682,671 A | 7/1954 | Faure |
| 2,764,422 A | 9/1956 | McDonald |
| 2,774,494 A | 12/1956 | Malmström |
| 2,825,582 A | 3/1958 | McDonald |
| 2,921,643 A | 1/1960 | Vanderveld |
| 2,925,876 A | 2/1960 | Wagner |
| 2,998,265 A | 8/1961 | Kozicki |
| 3,008,533 A | 11/1961 | Haberle |
| 3,012,633 A | 12/1961 | Magee |
| 3,039,562 A | 6/1962 | Wagner |
| 3,095,216 A | 6/1963 | Browne et al. |
| 3,164,394 A | 1/1965 | Husko |
| 3,172,499 A | 3/1965 | Stairs |
| 3,266,594 A | 8/1966 | Antosh et al. |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,515,406 A | 6/1970 | Endsley |
| 3,517,942 A | 6/1970 | Cuffe et al. |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,650,423 A | 3/1972 | O'Brien |
| 3,671,058 A | 6/1972 | Kent |
| 3,745,595 A | 7/1973 | Nagy |
| 3,756,622 A | 9/1973 | Pyle et al. |
| 3,762,742 A | 10/1973 | Bucklen |
| 3,784,227 A | 1/1974 | Rogge |
| 3,799,288 A | 3/1974 | Manuel |
| 3,807,757 A | 4/1974 | Carpenter et al. |
| 3,833,240 A | 9/1974 | Weiler |
| 3,853,369 A | 12/1974 | Holden |
| 3,863,890 A | 2/1975 | Ruffing |
| 3,865,399 A | 2/1975 | Way |
| 3,869,022 A | 3/1975 | Wallk |
| 3,869,169 A | 3/1975 | Johnson et al. |
| 3,887,217 A | 6/1975 | Thomas |
| 3,889,997 A | 6/1975 | Schoneck |
| 3,891,261 A | 6/1975 | Finneman |
| 3,913,497 A | 10/1975 | Maroshick |
| 3,915,475 A | 10/1975 | Casella et al. |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 3,986,724 A | 10/1976 | Rivinius |
| 3,997,211 A | 12/1976 | Graves |
| 4,020,920 A | 5/1977 | Abbott |
| 4,053,172 A | 10/1977 | McClure |
| 4,058,228 A | 11/1977 | Hall |
| 4,068,542 A | 1/1978 | Brand et al. |
| 4,073,502 A | 2/1978 | Frank et al. |
| 4,089,538 A | 5/1978 | Eastridge |
| 4,098,346 A | 7/1978 | Stanfill |
| 4,103,872 A | 8/1978 | Hirasuka |
| 4,106,790 A | 8/1978 | Weiler |
| 4,110,673 A | 8/1978 | Nagy et al. |
| 4,116,457 A | 9/1978 | Nerem et al. |
| 4,124,099 A | 11/1978 | Dudynskyj |
| 4,145,066 A | 3/1979 | Shearin |
| 4,164,292 A | 8/1979 | Karkau |
| 4,168,764 A | 9/1979 | Walters |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,194,754 A | 3/1980 | Hightower |
| 4,205,862 A | 6/1980 | Tarvin |
| 4,219,104 A | 8/1980 | MacLeod |
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |
| 5,280,934 A | 1/1994 | Monte |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |

(56) References Cited

U.S. PATENT DOCUMENTS

| | | | |
|---|---|---|---|
| 5,439,342 | A | 8/1995 | Hall et al. |
| 5,462,302 | A | 10/1995 | Leitner |
| 5,478,124 | A | 12/1995 | Warrington |
| 5,498,012 | A | 3/1996 | McDaniel et al. |
| 5,501,475 | A | 3/1996 | Bundy |
| 5,505,476 | A | 4/1996 | Maccabee |
| 5,513,866 | A | 5/1996 | Sisson |
| 5,538,100 | A | 7/1996 | Hedley |
| 5,538,265 | A | 7/1996 | Chen et al. |
| 5,538,269 | A | 7/1996 | McDaniel et al. |
| 5,547,040 | A | 8/1996 | Hanser et al. |
| 5,549,312 | A | 8/1996 | Garvert |
| 5,584,493 | A | 12/1996 | Demski et al. |
| 5,601,300 | A | 2/1997 | Fink et al. |
| 5,624,127 | A | 4/1997 | Arreola et al. |
| 5,697,623 | A | 12/1997 | Bermes et al. |
| 5,697,626 | A | 12/1997 | McDaniel |
| 5,727,840 | A | 3/1998 | Ochiai et al. |
| 5,779,208 | A | 7/1998 | McGraw |
| 5,842,709 | A | 12/1998 | Maccabee |
| 5,876,051 | A | 3/1999 | Sage |
| 5,897,125 | A | 4/1999 | Bundy |
| 5,937,468 | A | 8/1999 | Wiedeck et al. |
| 5,941,342 | A | 8/1999 | Lee |
| 5,957,237 | A | 9/1999 | Tigner |
| 5,980,449 | A | 11/1999 | Benson et al. |
| 5,988,970 | A | 11/1999 | Holtom |
| 6,012,545 | A | 1/2000 | Faleide |
| 6,027,090 | A | 2/2000 | Liu |
| 6,042,052 | A | 3/2000 | Smith et al. |
| 6,055,780 | A | 5/2000 | Yamazaki |
| 6,065,924 | A | 5/2000 | Budd |
| 6,082,693 | A | 7/2000 | Benson et al. |
| 6,082,751 | A | 7/2000 | Hanes et al. |
| 6,112,152 | A | 8/2000 | Tuttle |
| 6,135,472 | A | 10/2000 | Wilson et al. |
| 6,149,172 | A | 11/2000 | Pascoe et al. |
| 6,158,756 | A | 12/2000 | Hansen |
| 6,168,176 | B1 | 1/2001 | Mueller |
| 6,170,842 | B1 | 1/2001 | Mueller |
| 6,179,312 | B1 | 1/2001 | Paschke et al. |
| 6,179,546 | B1 | 1/2001 | Citrowske |
| 6,203,040 | B1 | 3/2001 | Hutchins |
| 6,213,486 | B1 | 4/2001 | Kunz et al. |
| 6,224,317 | B1 | 5/2001 | Kann |
| 6,264,222 | B1 | 7/2001 | Johnston et al. |
| 6,270,099 | B1 | 8/2001 | Farkash |
| 6,325,397 | B1 | 12/2001 | Pascoe |
| 6,352,295 | B1 | 3/2002 | Leitner |
| 6,357,992 | B1 | 3/2002 | Ringdahl et al. |
| 6,375,207 | B1 | 4/2002 | Dean et al. |
| 6,412,799 | B1 | 7/2002 | Schrempf |
| 6,422,342 | B1 | 7/2002 | Armstrong et al. |
| 6,425,572 | B1 | 7/2002 | Lehr |
| 6,430,164 | B1 | 8/2002 | Jones et al. |
| 6,435,534 | B1 | 8/2002 | Stone |
| 6,439,342 | B1 | 8/2002 | Boykin |
| 6,460,915 | B1 | 10/2002 | Bedi et al. |
| 6,471,002 | B1 | 10/2002 | Weinermen |
| 6,511,086 | B2 | 1/2003 | Schlicht |
| 6,511,402 | B2 | 1/2003 | Shu |
| 6,513,821 | B1 | 2/2003 | Heil |
| 6,533,303 | B1 | 3/2003 | Watson |
| 6,536,790 | B1 | 3/2003 | Ojanen |
| 6,588,783 | B2 | 7/2003 | Fichter |
| 6,612,596 | B2 | 9/2003 | Jeon et al. |
| 6,641,158 | B2 | 11/2003 | Leitner |
| 6,659,484 | B2 | 12/2003 | Knodle et al. |
| 6,663,125 | B1 | 12/2003 | Cheng |
| 6,746,033 | B1 | 6/2004 | McDaniel |
| 6,769,704 | B2 | 8/2004 | Cipolla |
| 6,810,995 | B2 | 11/2004 | Warford |
| 6,812,466 | B2 | 11/2004 | O'Connor et al. |
| 6,830,257 | B2 | 12/2004 | Leitner |
| 6,834,875 | B2 | 12/2004 | Leitner |
| 6,840,526 | B2 | 1/2005 | Anderson et al. |
| 6,874,801 | B2 | 4/2005 | Fichter |
| 6,880,843 | B1 | 4/2005 | Greer, Jr. |
| 6,912,912 | B2 | 7/2005 | Reichinger et al. |
| 6,918,624 | B2 | 7/2005 | Miller et al. |
| 6,926,295 | B2 | 8/2005 | Berkebile et al. |
| 6,938,909 | B2 | 9/2005 | Leitner |
| 6,942,233 | B2 | 9/2005 | Leitner et al. |
| 6,942,272 | B2 | 9/2005 | Livingston |
| 6,948,903 | B2 | 9/2005 | Ablabutyan et al. |
| 6,951,357 | B2 | 10/2005 | Armstrong et al. |
| 6,955,370 | B2 | 10/2005 | Fabiano et al. |
| 6,959,937 | B2 | 11/2005 | Schneider et al. |
| 6,966,597 | B2 | 11/2005 | Tegtmeier |
| 6,971,652 | B2 | 12/2005 | Bobbert et al. |
| 6,997,469 | B2 | 2/2006 | Lanoue et al. |
| 7,000,932 | B2 | 2/2006 | Heil et al. |
| 7,007,961 | B2 | 3/2006 | Leitner |
| 7,017,927 | B2 | 3/2006 | Henderson et al. |
| 7,055,839 | B2 | 6/2006 | Leitner |
| 7,090,276 | B1 | 8/2006 | Bruford et al. |
| 7,111,859 | B2 | 9/2006 | Kim et al. |
| 7,118,120 | B2 | 10/2006 | Lee et al. |
| 7,163,221 | B2 | 1/2007 | Leitner |
| 7,258,386 | B2 | 8/2007 | Leitner |
| 7,287,771 | B2 | 10/2007 | Lee et al. |
| 7,360,779 | B2 | 4/2008 | Crandall |
| 7,367,574 | B2 | 5/2008 | Leitner |
| 7,380,807 | B2 | 6/2008 | Leitner |
| 7,398,985 | B2 | 7/2008 | Leitner et al. |
| 7,413,204 | B2 | 8/2008 | Leitner |
| 7,416,202 | B2 | 8/2008 | Fichter |
| 7,487,986 | B2 | 2/2009 | Leither et al. |
| 7,516,703 | B2 | 4/2009 | Tazreiter |
| 7,566,064 | B2 | 7/2009 | Leitner et al. |
| 7,584,975 | B2 | 9/2009 | Leitner |
| 7,594,672 | B2 | 9/2009 | Piotrowski |
| 7,621,546 | B2 | 11/2009 | Ross et al. |
| 7,637,519 | B2 | 12/2009 | Leitner et al. |
| 7,673,892 | B2 | 3/2010 | Kuntze et al. |
| 7,717,444 | B2 | 5/2010 | Fichter |
| 7,740,261 | B2 | 6/2010 | Leitner et al. |
| 7,793,596 | B2 | 9/2010 | Hirtenlehner |
| 7,823,896 | B2 | 11/2010 | VanBelle |
| 7,874,565 | B2 | 1/2011 | Duncan |
| D634,687 | S | 3/2011 | Vukel |
| 7,900,944 | B2 | 3/2011 | Watson |
| 7,909,344 | B1 | 3/2011 | Bundy |
| 7,934,737 | B2 | 5/2011 | Okada |
| 7,976,042 | B2 | 7/2011 | Watson et al. |
| 8,038,164 | B2 | 10/2011 | Stahl et al. |
| 8,042,821 | B2 | 10/2011 | Yang |
| D649,100 | S | 11/2011 | Cheng |
| 8,052,162 | B2 | 11/2011 | Yang et al. |
| 8,056,913 | B2 | 11/2011 | Kuntze et al. |
| 8,070,173 | B2 | 12/2011 | Watson |
| 8,136,826 | B2 | 3/2012 | Watson |
| 8,146,935 | B1 | 4/2012 | Adams |
| 8,157,277 | B2 | 4/2012 | Leitner et al. |
| 8,177,247 | B1 | 5/2012 | Carr |
| 8,205,901 | B2 | 6/2012 | Yang et al. |
| D665,713 | S | 8/2012 | Pochurek et al. |
| 8,262,113 | B1 | 9/2012 | Chafey et al. |
| 8,297,635 | B2 | 10/2012 | Agoncillo et al. |
| D671,874 | S | 12/2012 | Kekich et al. |
| 8,342,550 | B2 | 1/2013 | Stickles et al. |
| 8,342,551 | B2 | 1/2013 | Watson et al. |
| 8,360,455 | B2 | 1/2013 | Leitner et al. |
| 8,408,571 | B2 | 4/2013 | Leitner et al. |
| 8,419,034 | B2 | 4/2013 | Leitner et al. |
| 8,469,380 | B2 | 6/2013 | Yang et al. |
| 8,602,431 | B1 | 12/2013 | May |
| 8,827,294 | B1 | 9/2014 | Leitner et al. |
| 8,833,782 | B2 | 9/2014 | Huotari et al. |
| 8,844,957 | B2 | 9/2014 | Leitner et al. |
| D720,674 | S | 1/2015 | Stanesic et al. |
| 8,936,266 | B2 | 1/2015 | Leitner et al. |
| 8,944,451 | B2 | 2/2015 | Leitner et al. |
| 9,156,406 | B2 | 10/2015 | Stanesic et al. |

(56) References Cited

U.S. PATENT DOCUMENTS

| | | |
|---|---|---|
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2 | 9/2017 | Stickles et al. |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 9,975,742 B1 | 5/2018 | Mason |
| 10,010,467 B2 | 7/2018 | Sato |
| 10,049,505 B1 | 8/2018 | Harvey |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2 | 11/2018 | Du et al. |
| 10,124,839 B2 | 11/2018 | Povinelli et al. |
| 10,140,618 B2 | 11/2018 | Crawford |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1 | 8/2019 | Du et al. |
| 10,427,607 B2 | 10/2019 | Otacioglu |
| 10,539,285 B1 | 1/2020 | Johnson |
| 10,576,879 B1 | 3/2020 | Salter |
| 10,618,472 B2 | 4/2020 | Du |
| 10,649,483 B2 | 5/2020 | Liu et al. |
| 10,682,960 B2 | 6/2020 | Du |
| 10,821,904 B2 | 11/2020 | Du |
| 10,885,759 B1 | 1/2021 | Lee |
| 11,021,108 B2 | 6/2021 | Du |
| 11,198,394 B2 | 12/2021 | Du et al. |
| 11,208,043 B2 | 12/2021 | Du et al. |
| 11,208,044 B2 | 12/2021 | Smith et al. |
| 11,292,390 B2 | 4/2022 | Du et al. |
| 11,318,889 B2 | 5/2022 | Du et al. |
| 11,414,017 B2 | 8/2022 | Qing et al. |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0231149 A1 | 10/2005 | Numauchi |
| 2005/0280242 A1* | 12/2005 | Fabiano ............... B60R 3/002 280/164.1 |
| 2006/0082096 A1 | 4/2006 | Sukonthapanich et al. |
| 2006/0214386 A1 | 9/2006 | Watson |
| 2006/0219484 A1 | 10/2006 | Ogura |
| 2006/0284440 A1 | 12/2006 | Leitner |
| 2007/0017743 A1* | 1/2007 | Yeh ...................... B60R 3/02 182/127 |
| 2008/0042396 A1 | 2/2008 | Watson |
| 2008/0100023 A1 | 5/2008 | Ross |
| 2008/0100025 A1 | 5/2008 | Leitner et al. |
| 2009/0250896 A1 | 10/2009 | Watson |
| 2009/0295114 A1 | 12/2009 | Yang et al. |
| 2009/0295115 A1 | 12/2009 | Yang et al. |
| 2010/0044993 A1 | 2/2010 | Watson |
| 2011/0115187 A1 | 5/2011 | Leitner et al. |
| 2011/0246021 A1 | 10/2011 | Prokhorov |
| 2012/0025485 A1 | 2/2012 | Yang et al. |
| 2012/0046846 A1 | 2/2012 | Dollens |
| 2013/0154230 A1 | 6/2013 | Ziaylek |
| 2015/0094898 A1 | 4/2015 | Tellis |
| 2015/0097353 A1 | 4/2015 | Rasmussen et al. |
| 2015/0137482 A1 | 5/2015 | Woolf |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2016/0280190 A1 | 9/2016 | Franz |
| 2017/0008459 A1 | 1/2017 | Leitner et al. |
| 2017/0021781 A1 | 1/2017 | Du |
| 2017/0036605 A1 | 2/2017 | Du |
| 2017/0036606 A1 | 2/2017 | Du |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0095457 A1 | 4/2018 | Lee |
| 2018/0118530 A1 | 5/2018 | August |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0293811 A1 | 10/2018 | Liu |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0292026 A1 | 9/2019 | Felps |
| 2020/0023779 A1 | 1/2020 | Du et al. |
| 2020/0023780 A1 | 1/2020 | Du et al. |
| 2020/0047674 A1 | 2/2020 | Du et al. |
| 2020/0262354 A1 | 8/2020 | Du et al. |
| 2020/0265658 A1 | 8/2020 | Du et al. |
| 2020/0269763 A1 | 8/2020 | Du et al. |
| 2020/0277169 A1 | 9/2020 | Zhan |
| 2020/0282814 A1 | 9/2020 | Alban et al. |
| 2020/0282913 A1 | 9/2020 | Qing |
| 2020/0290424 A1 | 9/2020 | Zhan |
| 2020/0299116 A1 | 9/2020 | Fan |
| 2020/0282914 A1 | 10/2020 | Du et al. |
| 2020/0331396 A1 | 10/2020 | Du et al. |
| 2021/0078591 A1 | 3/2021 | Du et al. |
| 2021/0213885 A1 | 7/2021 | Du et al. |
| 2021/0347303 A1 | 11/2021 | Qing et al. |
| 2021/0347304 A1 | 11/2021 | Qing et al. |
| 2022/0194299 A1 | 6/2022 | Du et al. |
| 2022/0219612 A1 | 7/2022 | Du et al. |

FOREIGN PATENT DOCUMENTS

| | | |
|---|---|---|
| CA | 2218280 A1 | 6/1999 |
| CA | 2332193 A1 | 9/2001 |
| CA | 2370618 A1 | 11/2007 |
| CN | 2174368 Y | 8/1994 |

(56) References Cited

FOREIGN PATENT DOCUMENTS

| | | |
|---|---|---|
| CN | 2806241 Y | 8/2006 |
| CN | 1976833 A | 6/2007 |
| CN | 101279594 A | 10/2008 |
| CN | 102394918 A | 3/2012 |
| CN | 202806579 U | 3/2013 |
| CN | 103507719 A | 1/2014 |
| CN | 203728468 U | 7/2014 |
| CN | 104192070 A | 12/2014 |
| CN | 2044474223 U | 7/2015 |
| CN | 105083136 A | 11/2015 |
| CN | 105083137 A | 11/2015 |
| CN | 105128751 A | 12/2015 |
| CN | 105450762 A | 3/2016 |
| CN | 106249641 A | 12/2016 |
| CN | 106499293 A | 3/2017 |
| CN | 107601333 A | 1/2018 |
| CN | 207361653 U | 5/2018 |
| CN | 108263303 A | 7/2018 |
| CN | 108454518 A | 8/2018 |
| CN | 207758678 U | 8/2018 |
| CN | 108583446 A | 9/2018 |
| CN | 108632335 A | 10/2018 |
| CN | 108791086 A | 11/2018 |
| CN | 208037900 U | 11/2018 |
| CN | 108973868 A | 12/2018 |
| CN | 208232903 U | 12/2018 |
| CN | 109253888 A | 1/2019 |
| CN | 208325054 U | 1/2019 |
| CN | 208344082 U | 1/2019 |
| CN | 208532082 U | 2/2019 |
| DE | 1042403 B | 10/1958 |
| DE | 1220276 B | 6/1966 |
| DE | 2555468 A1 | 6/1977 |
| DE | 7922488 U1 | 7/1982 |
| DE | 3151621 A1 | 7/1983 |
| DE | 3932142 | 4/1990 |
| DE | 8910933 U1 | 10/1990 |
| EP | 0066493 | 12/1982 |
| EP | 373842 A1 | 6/1990 |
| EP | 0418615 A1 | 3/1991 |
| EP | 0559624 B1 | 8/1995 |
| EP | 0966367 A1 | 9/1998 |
| EP | 0901783 A2 | 3/1999 |
| EP | 1116840 A2 | 7/2001 |
| EP | 1213185 B1 | 12/2004 |
| EP | 3002157 | 4/2016 |
| EP | 3176038 B1 | 1/2019 |
| EP | 3237254 B1 | 2/2019 |
| FR | 1271901 A | 9/1961 |
| FR | 1350593 A | 12/1963 |
| FR | 2225612 A | 8/1974 |
| FR | 2651739 A1 | 3/1991 |
| FR | 2764254 A1 | 12/1998 |
| GB | 191315077 | 8/1913 |
| GB | 254426 | 7/1926 |
| GB | 340162 A | 12/1930 |
| GB | 381672 | 10/1932 |
| GB | 745918 | 3/1956 |
| GB | 934387 | 8/1963 |
| GB | 936846 | 9/1963 |
| GB | 987846 A | 3/1965 |
| GB | 1430813 A | 4/1976 |
| GB | 1471256 A | 4/1977 |
| GB | 2045699 A | 11/1980 |
| GB | 2055705 A | 3/1981 |
| GB | 2129378 | 5/1984 |
| GB | 2201511 A | 9/1988 |
| GB | 2288014 A | 10/1995 |
| IN | 201741011829 | 10/2018 |
| JP | 63-255144 A | 10/1988 |
| JP | H04138944 A | 5/1992 |
| JP | H04339040 A | 11/1992 |
| JP | H04342629 A | 11/1992 |
| JP | H05310061 A | 11/1993 |
| JP | H05310081 A | 11/1993 |
| JP | H08132967 A | 5/1996 |
| JP | H10287182 A | 10/1998 |
| JP | 2018-177089 A | 11/2018 |
| JP | 2019-001222 A | 1/2019 |
| KR | 2000-0003099 | 2/2000 |
| KR | 101719102 B1 | 3/2017 |
| MX | 2017001699 A | 8/2018 |
| MX | 2017001700 A | 8/2018 |
| MX | 2017006328 A | 8/2018 |
| MX | 2017008032 A | 9/2018 |
| MX | 2017010183 A | 9/2018 |
| SU | 403594 | 11/1973 |
| SU | 783097 A1 | 11/1980 |
| WO | 1988/05759 A1 | 8/1988 |
| WO | 1995/00359 A1 | 1/1995 |
| WO | 1997/027139 A1 | 7/1997 |
| WO | 1998/43856 A2 | 10/1998 |
| WO | 2000/047449 A1 | 8/2000 |
| WO | 2001/000441 A1 | 1/2001 |
| WO | 2003/039910 A1 | 5/2003 |
| WO | 2003/039920 A1 | 5/2003 |
| WO | 2003/066380 A1 | 8/2003 |
| WO | 2003/069294 A1 | 8/2003 |
| WO | 2006/050297 A2 | 5/2006 |
| WO | 2009/103163 A1 | 8/2009 |
| WO | 2017/176226 A1 | 10/2017 |
| WO | 2018/148643 A1 | 8/2018 |
| WO | 2018/197393 A1 | 11/2018 |
| WO | 2019/009131 A1 | 1/2019 |
| WO | 2019/034493 A1 | 2/2019 |

OTHER PUBLICATIONS

U.S. Office Action dated Nov. 18, 2019 for U.S. Appl. No. 16/510,775, filed Jul. 12, 2019. (9 pages).
U.S. Office Action dated Dec. 20, 2019 for U.S. Appl. No. 16/655,149, filed Oct. 16, 2019. (11 pages).
International Search Report and Written Opinion of the International Searching Authority for PCT International Application No. PCT/CN2019/075535 dated Nov. 11, 2019. (English translation, p. 1-21).
International Search Report of the International Searching Authority for PCT International Application No. PCT/CN2019/077842 dated Oct. 12, 2019. (English Translation, p. 1-20).
International Search Report and Written Opinion of the International Searching Authority for PCT International Application No. PCT/CN2019/082919 dated Oct. 11, 2019. (English Translation, p. 1-20).
U.S. Office Action dated Jun. 9, 2020 for U.S. Appl. No. 16/826,094, filed Mar. 20, 2020 (10 pages).
U.S. Office Action dated Jun. 9, 2020 for U.S. Appl. No. 15/931,474, filed May 13, 2020 (12 pages).
U.S. Notice of Allowance for U.S. Appl. No. 16/510,775 dated Feb. 3, 2020.
U.S. Notice of Allowance for U.S. Appl. No. 16/655,149 dated Feb. 20, 2020.
U.S. Notice of Allowance for U.S. Appl. No. 16/826,083 dated Oct. 9, 2020.
Australian Application No. 2019250149 Office Action dated Oct. 6, 2020, pp. 1-4).
Final Office Action dated Oct. 27, 2020 for U.S. Appl. No. 15/931,474, filed Oct. 27, 2020 (13 pages).
Final Office Action dated Feb. 16, 2021 for U.S. Appl. No. 16/826,094, filed Mar. 20, 2020 (15 pages).
Non-Final Office Action dated Jun. 10, 2021 for U.S. Appl. No. 16/517,527, filed Jul. 19, 2019 (6 pages).
U.S. Appl. No. 16/742,632 Notice of Allowance dated Jun. 29, 2021, pp. 1-7.
Chinese Application No. 201910125764.6 Office Action dated May 6, 2021, pp. 1-13.

* cited by examiner

STEP APPARATUS FOR VEHICLE AND VEHICLE

CROSS-REFERENCE TO RELATED APPLICATIONS

This application claims the benefit of priority to Chinese Patent Application Nos. 202010393602.3 and 202020770820.X, both applications filed on May 11, 2020, of which the content of each application is incorporated herein by reference in its entirety and for all purposes.

TECHNICAL FIELD

The present disclosure relates to a field of vehicle technologies, and more particularly to a step apparatus for a vehicle and a vehicle having the same.

BACKGROUND

A vehicle step is usually arranged on a chassis under a door to assist a person in getting into or out of a vehicle. The vehicle step is driven by an extension and retraction mechanism to move between an extended position and a retracted position, and the extension and retraction mechanism is connected to the chassis of the vehicle. In the related art, the vehicle step is driven by the extension and retraction mechanism, and the extended position is located below and at an outer side of the retracted position. Such design may attribute the vehicle step with poor stability, as the extension and retraction mechanism has a complex structure, poor flexibility, and poor applicability.

SUMMARY

An aspect of the present disclosure provides a step apparatus for a vehicle.

Another aspect of the present disclosure also provides a vehicle.

The step apparatus for the vehicle, according to an embodiment of the first aspect of the present disclosure, includes a step; a lifting device connected to the step and configured to be unfolded and folded to adjust a level of the step; and a driver connected to the lifting device and configured to drive the lifting device to be unfolded and folded.

The vehicle, according to an embodiment of the second aspect of the present disclosure, includes a vehicle body and a step apparatus for a vehicle. The step apparatus for the vehicle includes a step; a lifting device connected to the step and configured to be unfolded and folded to adjust a level of the step; and a driver connected to the lifting device and configured to drive the lifting device to be unfolded and folded. The step apparatus for the vehicle is mounted to a bottom surface of the vehicle body.

DETAILED DESCRIPTION

Figure 1:
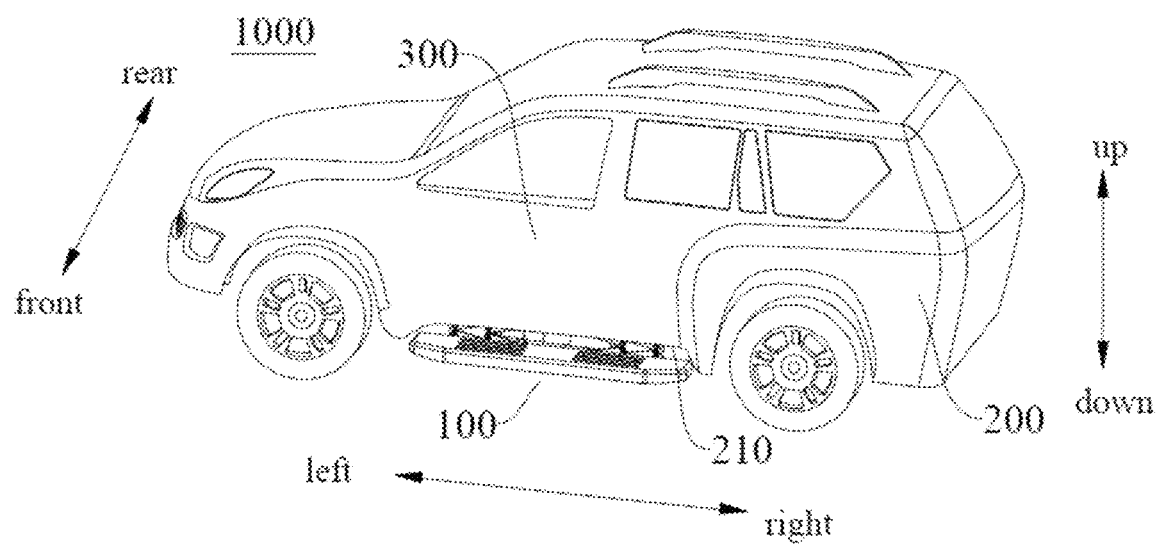
FIG. 1 is a perspective view of a vehicle according to an embodiment of the present disclosure.

Reference will be made in detail to embodiments of the present disclosure. The embodiments described herein with reference to drawings are explanatory, illustrative, and used to generally convey the present disclosure. The embodiments shall not be construed to limit the present disclosure. In the specification, it should be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential," etc., should be construed to refer to orientations or positions as illustrated in the drawings. These relative terms are for convenience of description and do not require that the present disclosure should be constructed or operated in a particular orientation, so they are not to be construed as a limit to the present disclosure.

A step apparatus for a vehicle and a vehicle according to an embodiment of the present disclosure will be described with reference to the accompanying drawings.

As illustrated in FIGS. 1-4, a vehicle 1000 according to an embodiment of the present disclosure includes a vehicle body 200 and a step apparatus 100 for the vehicle 1000. The step apparatus 100 for the vehicle 1000 is arranged on a bottom surface 210 of the vehicle body, i.e., a vehicle chassis.

As illustrated in FIGS. 1-4, the vehicle 1000 includes a door 300, and the step apparatus 100 for the vehicle 1000 is arranged adjacent to and located below the door 300. In the embodiment illustrated in FIGS. 1-4, the vehicle 1000 has two doors 300, and the door 300 is a side door. The present disclosure is not limited to this example embodiment. For example, the vehicle 1000 may have four doors (side doors) 300—with two side doors 300 arranged on each side of the vehicle body 200—and one step apparatus 100 for the vehicle 1000 may be arranged on each side of the vehicle body 200. In some embodiments, the vehicle 1000 may also have a back door (not illustrated), and another step apparatus 100 for the vehicle 1000 adjacent to the back door is arranged at the rear of the vehicle body 200.

The step apparatus for the vehicle 1000 according to the embodiment of the present disclosure will be described below.

As illustrated in FIGS. 5-12, the step apparatus 100 for the vehicle 1000 according to the embodiment of the present disclosure includes a step 1, a lifting device 2, and a driver 3.

The lifting device 2 is connected to the step 1, and the lifting device 2 can be unfolded and folded to adjust a level of the step 1. As illustrated in FIGS. 1-12, the step 1 is connected to the bottom surface 210 of the vehicle body through the lifting device 2, and a distance between the step 1 and the ground can be changed under the action of the lifting device 2.

The driver 3 is connected to the lifting device 2, and the driver 3 is configured to drive the lifting device 2 to be unfolded and folded. As illustrated in FIGS. 5-12, the driver 3 is a linear driver, which can be extended and retracted for linear movements, thereby driving the lifting device 2 to be unfolded to reduce a height of the step 1 (that is, the step 1 moves away from the bottom surface 210 of the vehicle body in an up-down direction), and driving the lifting device 2 to be folded to increase the height of the step 1 (that is, the step 1 moves towards the bottom surface 210 of the vehicle body in the up-down direction). Specifically, the linear driver may be a hydraulic cylinder, an air cylinder, an electric push rod, or the like.

In the step apparatus 100 for the vehicle 1000 according to the embodiment of the present disclosure, the lifting device 2 is connected to the step 1 and can be unfolded and folded under the drive of the driver 3, so as to facilitate adjustments of the level of the step 1, thus providing a simple structure, good stability, and good flexibility and improving applicability.

In some embodiments, the step 1 has a side bar position, a step position, and a jack position. In the side bar position, the step 1 is located at a lower edge of a side face of the vehicle body 200. In the step position, the step 1 is located between the side bar position and the ground. In the jack position, the step 1 abuts the ground to be configured to jack up the vehicle body 200.

Figure 2:
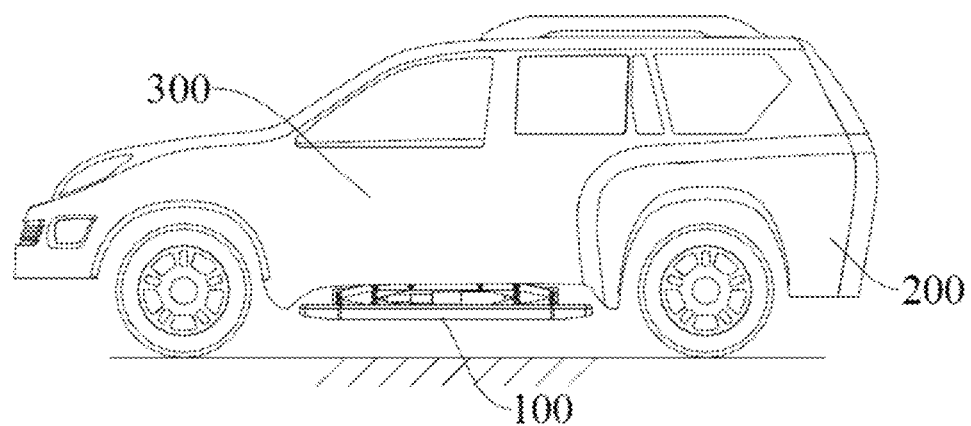
FIG. 2 is a perspective view of the vehicle illustrated in FIG. 1, in which a step is in a side bar position.

As illustrated in FIG. 2, when the lifting device 2 is in a fully folded state, the step 1 has a smallest distance from or is closest to the bottom surface 210 of the vehicle body in the up-down direction, so as to be located at the side bar position. That is, the step 1 is located at the lower edge of the side face of the vehicle body 200, and the step 1 exceeds a width of the vehicle body 200 in a width direction of the vehicle body 200 (i.e., a front-rear direction in FIG. 1), such that the step 1 can serve as a bumper of the vehicle body 200 to have a protective function to protect the vehicle body 200, thus preventing the vehicle 1000 from being hit or scratched.

Figure 3:
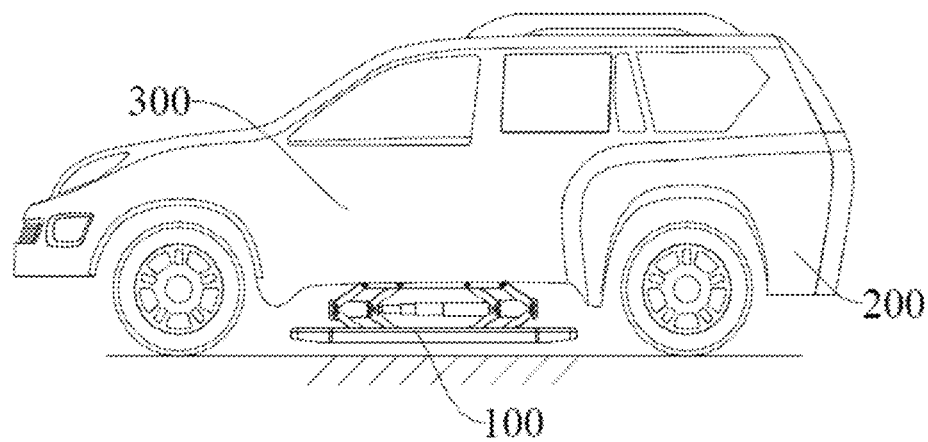
FIG. 3 is a perspective view of the vehicle illustrated in FIG. 1, in which a step is in a step position.

As illustrated in FIG. 3, when the lifting device 2 is unfolded from the fully folded state to a first unfolded state, the step 1 moves downwards away from the side bar position and is higher than the ground, and a person can get on the vehicle by using the step 1.

Figure 4:
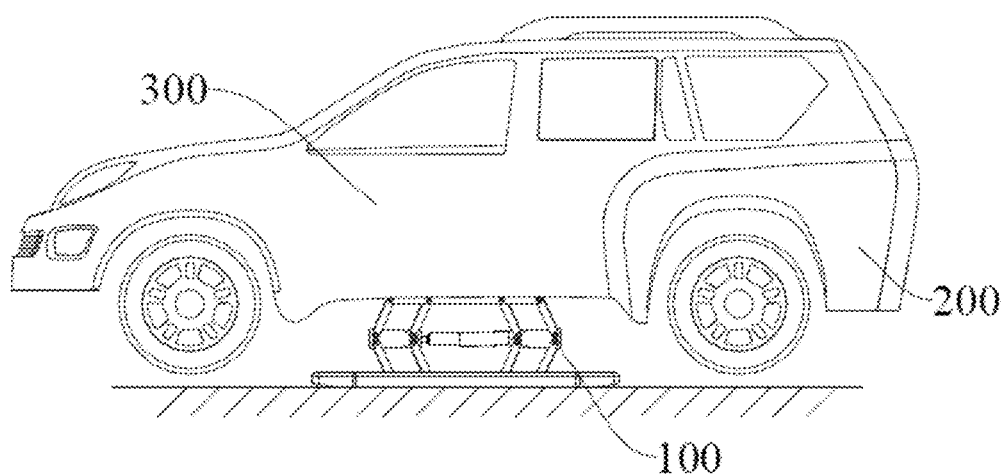
FIG. 4 is a perspective view of the vehicle illustrated in FIG. 1, in which a step is in a jack position.

As illustrated in FIG. 4, when the lifting device 2 continues to be unfolded from the first unfolded state to the second unfolded state, the step 1 continues to move downwards to abut the ground so as to lift up the vehicle body 200. Tires of the vehicle 1000 are separated from the ground for repair of the vehicle, with the lifting device 2 thereby acting as a jack.

In some embodiments, the lifting device 2 includes a foldable arm assembly 23, which is pivotably connected to the step 1 and the bottom surface 210 of the vehicle body. The driver 3 is connected to the arm assembly 23 to drive the arm assembly 23 to be unfolded and folded. The step 1 is driven to move among the side bar position, the step position, and the jack position by the arm assembly 23 under the drive of the driver 3.

Figure 5:
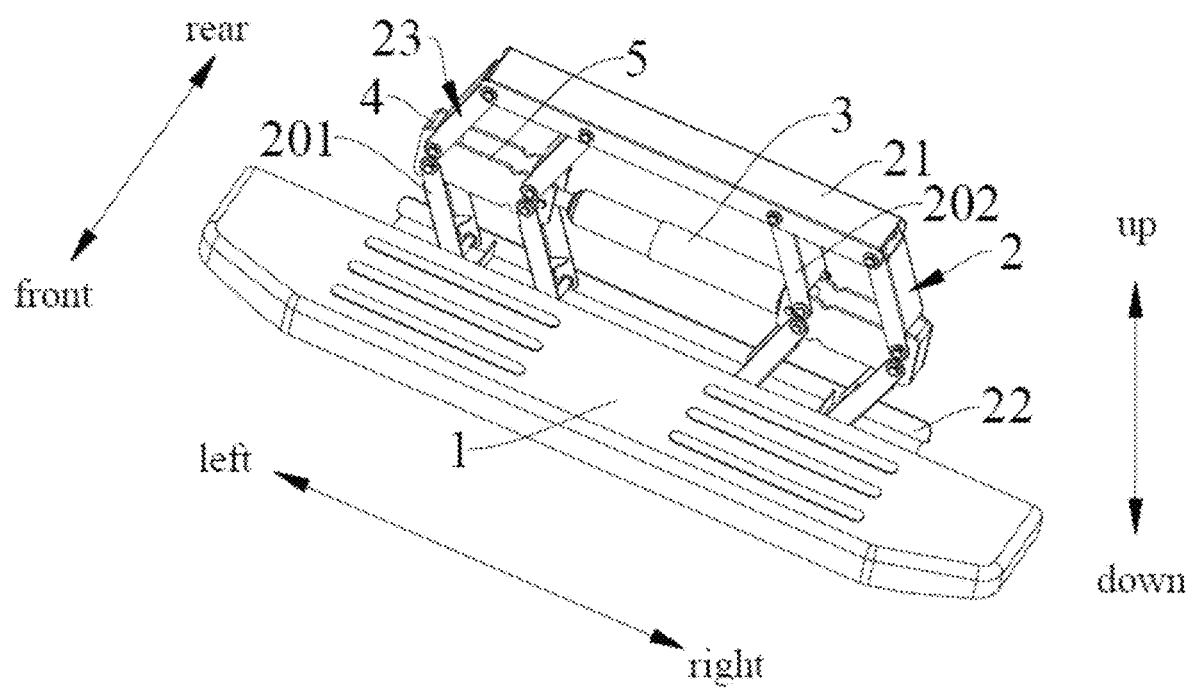
FIG. 5 is a perspective view of a step apparatus for a vehicle according to an embodiment of the present disclosure.
Figure 6:
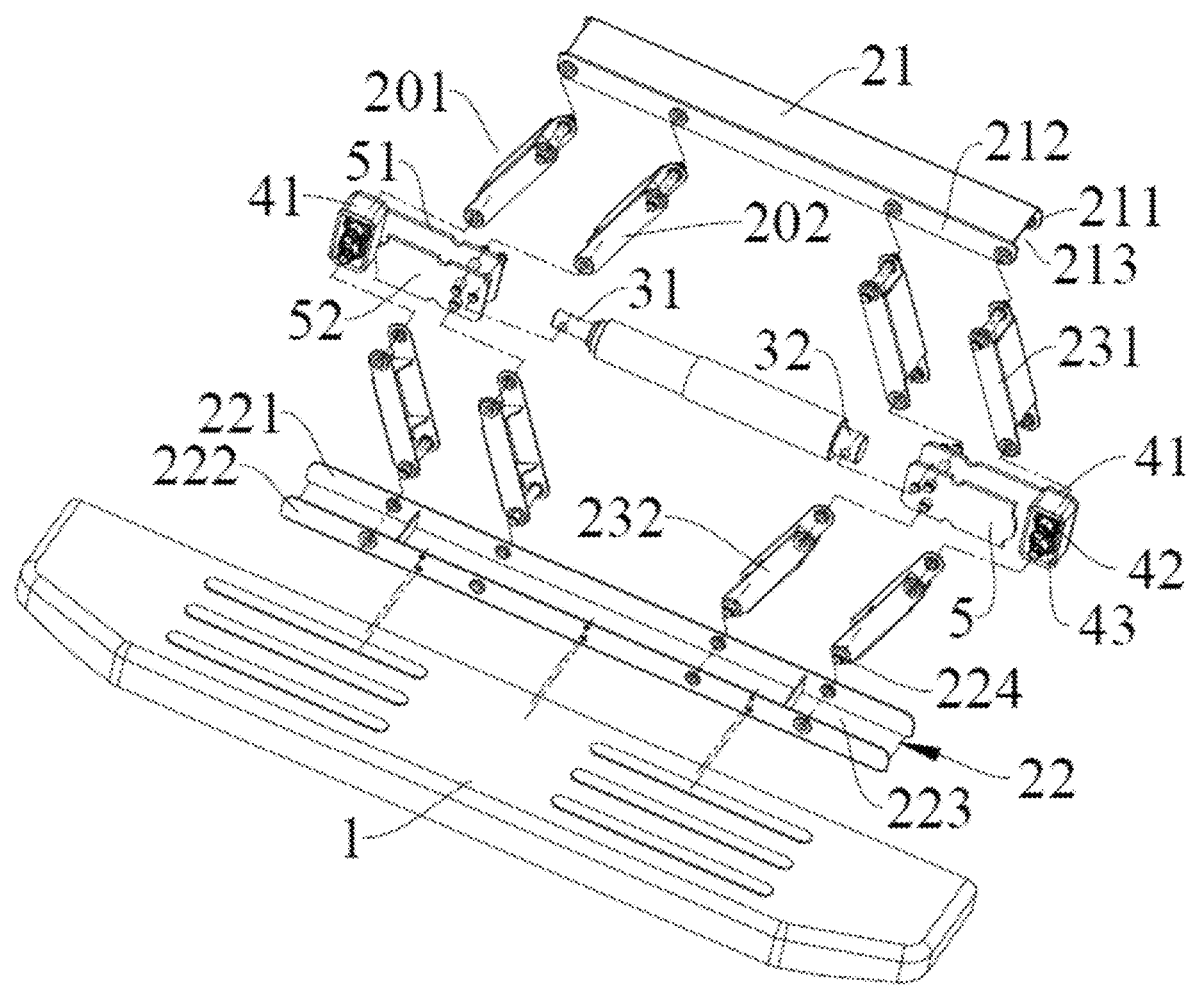
FIG. 6 is an exploded view of the step apparatus for the vehicle illustrated in FIG. 5.
Figure 7:
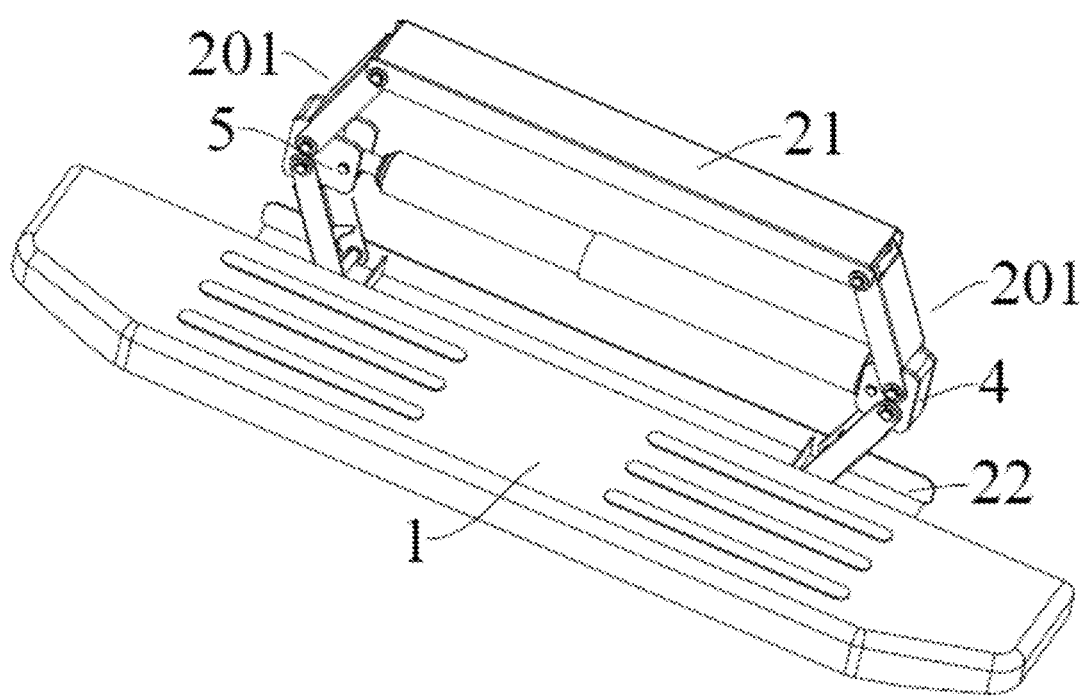
FIG. 7 is a perspective view of a step apparatus for a vehicle according to another embodiment of the present disclosure.
Figure 8:
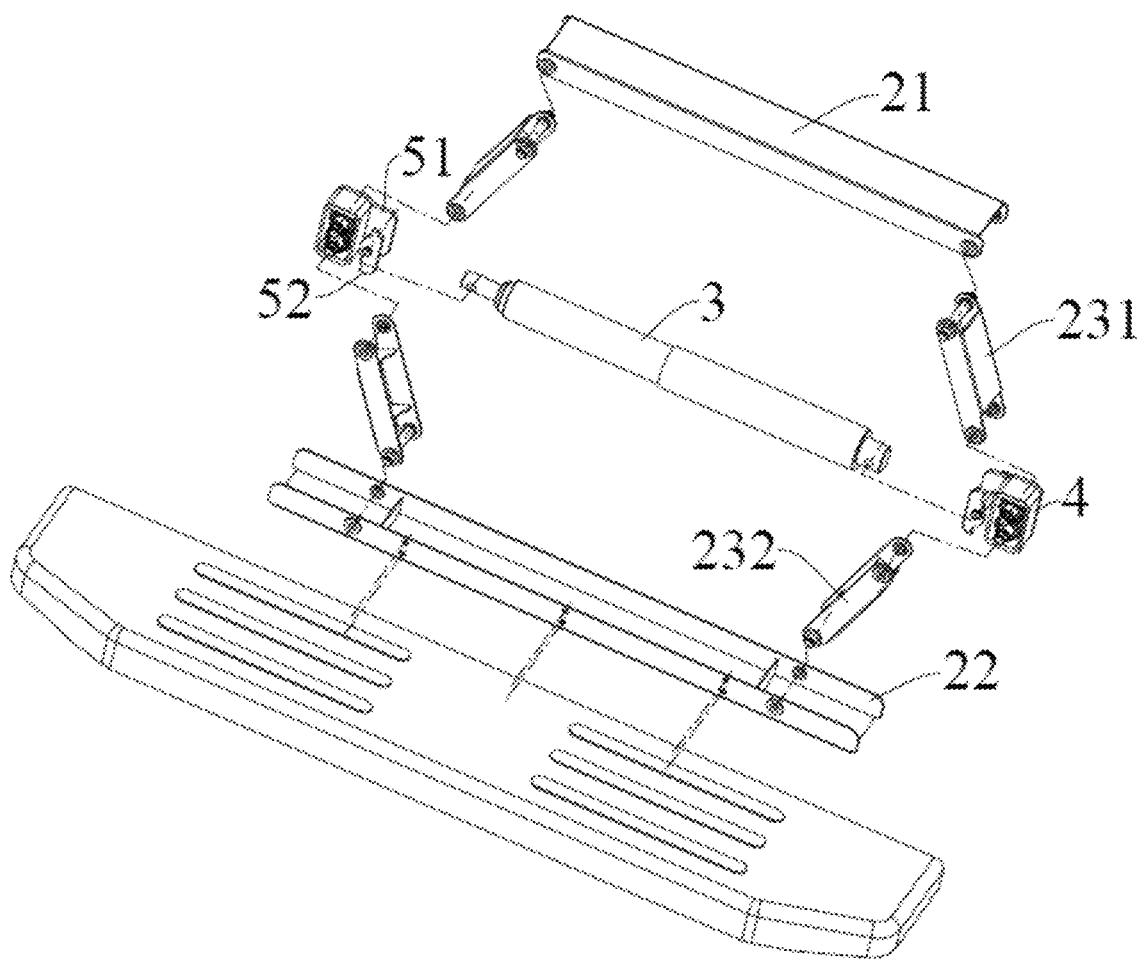
FIG. 8 is an exploded view of the step apparatus for the vehicle illustrated in FIG. 7.
Figure 9:
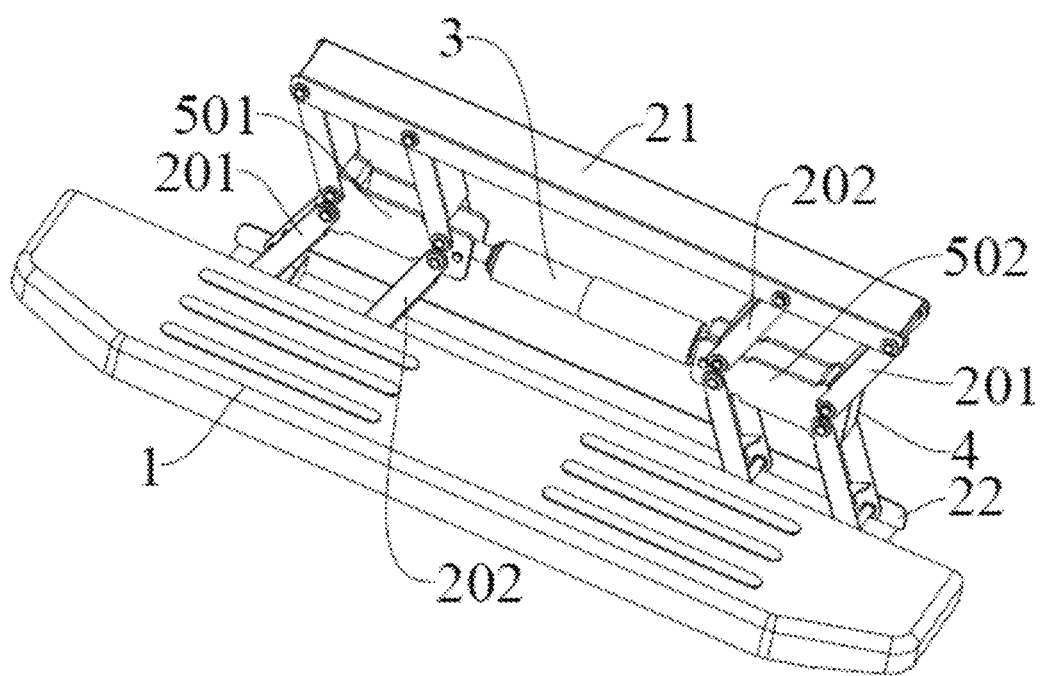
FIG. 9 is a perspective view of a step apparatus for a vehicle according to still another embodiment of the present disclosure.
Figure 10:
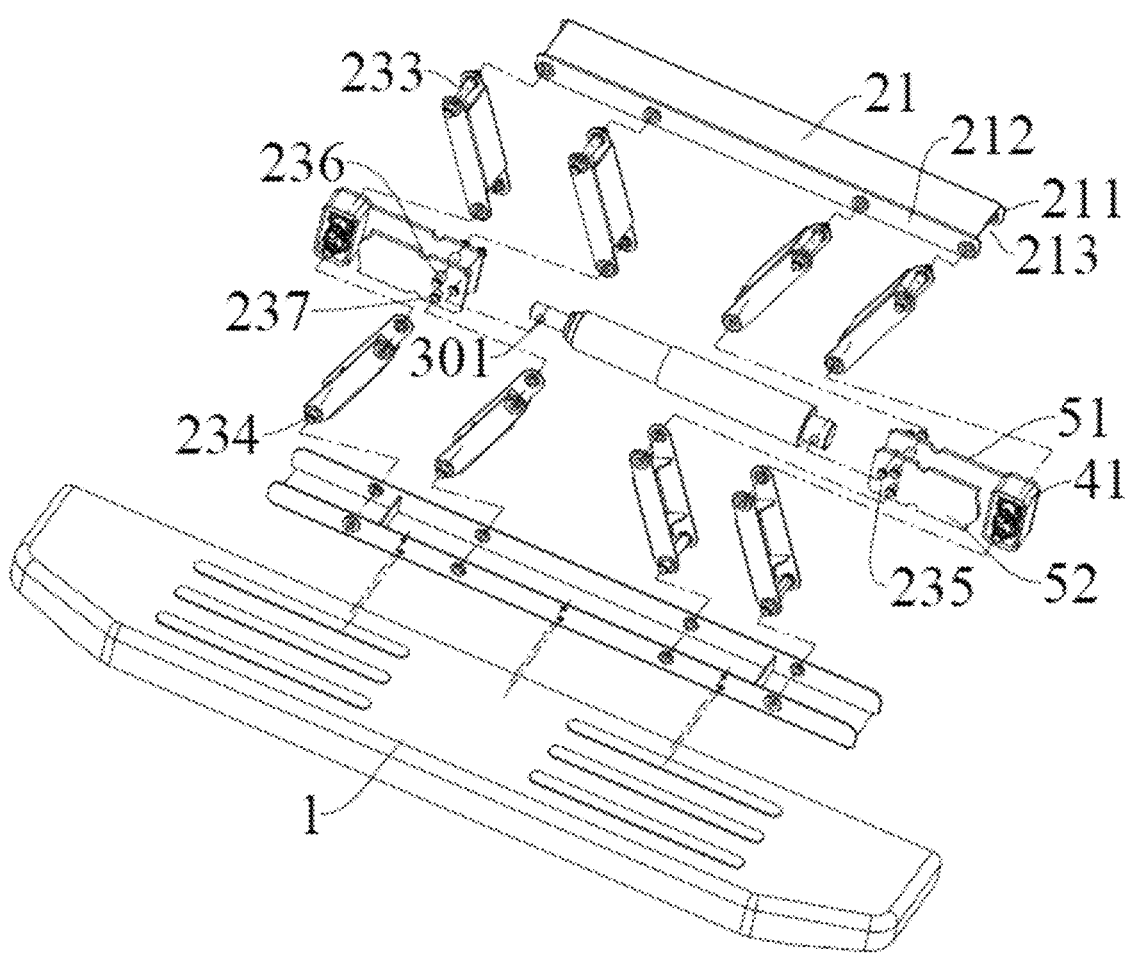
FIG. 10 is an exploded view of the step apparatus for the vehicle illustrated in FIG. 9.
Figure 11:
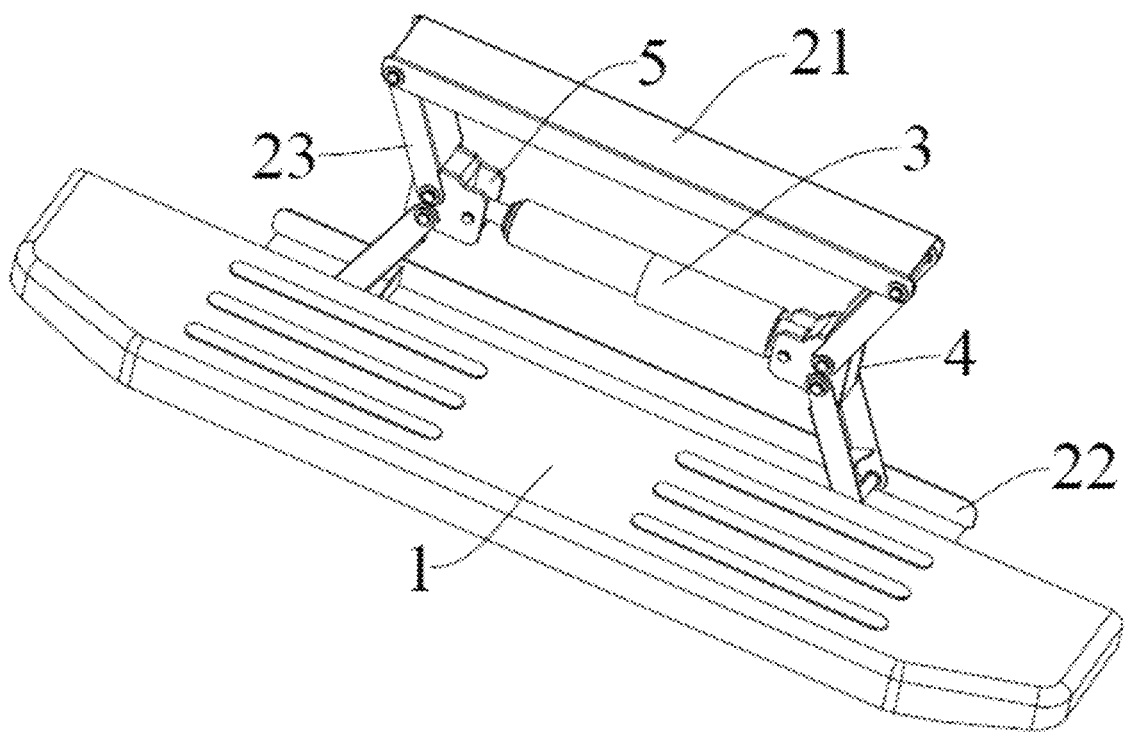
FIG. 11 is a perspective view of a step apparatus for a vehicle according to yet another embodiment of the present disclosure.
Figure 12:
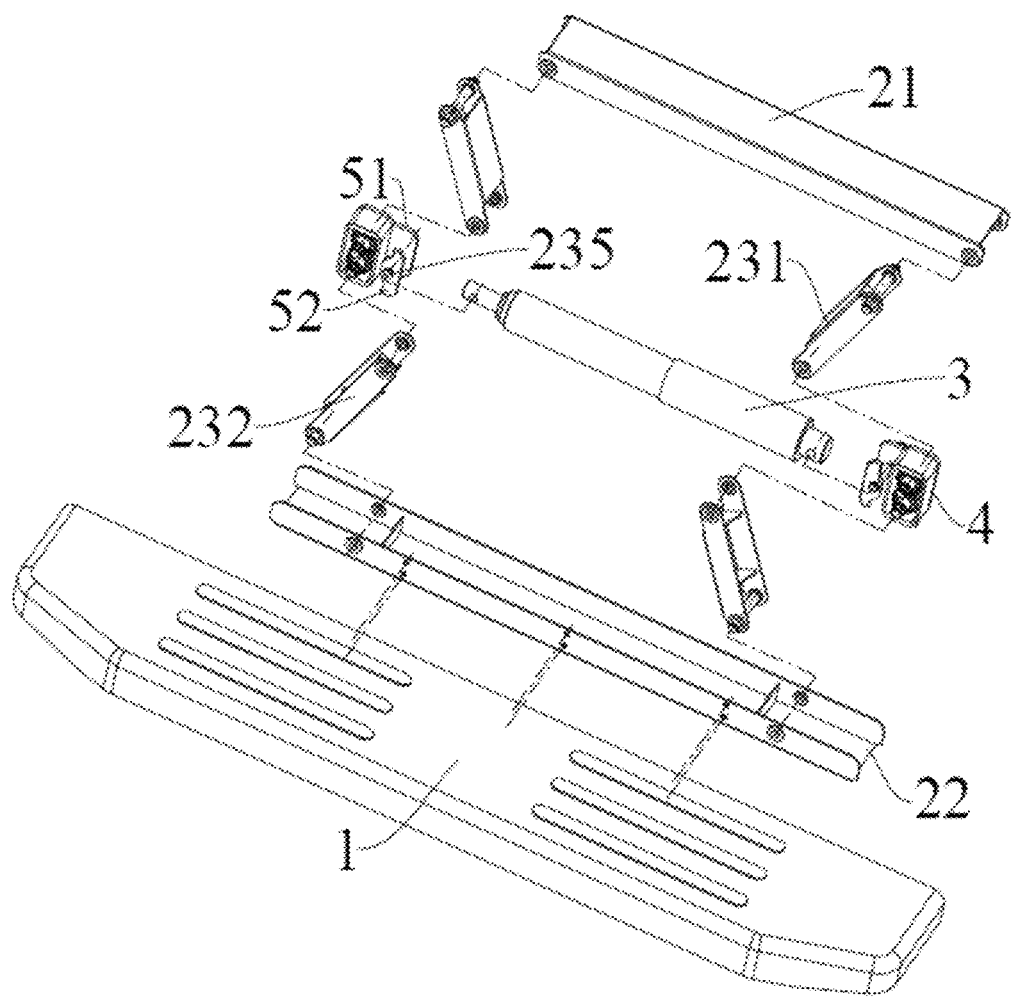
FIG. 12 is an exploded view of the step apparatus for the vehicle illustrated in FIG. 11.

In some embodiments, the lifting device 2 further includes a mounting base 21 adapted to be mounted to the bottom surface 210 of the vehicle body, and the arm assembly 23 is pivotably connected to the mounting base 21. In other words, the arm assembly 23 is not limited to being directly pivotably connected to the bottom surface 210 of the vehicle body; it can also be pivotably connected to the bottom surface 210 of the vehicle body through the mounting base 21. Specifically, as illustrated in FIG. 5, the mounting base 21 is adapted to be fixedly connected to the bottom surface 210 of the vehicle body, and an upper end of the arm assembly 23 is pivotably connected to the mounting base 21.

In some embodiments, the lifting device 2 further includes a step base 22; the step 1 is mounted to the step base 22, and the arm assembly 23 is pivotably connected to the step base 22. In other words, the arm assembly 23 is not limited to a manner in which the arm assembly 23 is directly pivotably connected to the step 1; it can also be pivotably connected to the step 1 through the step base 22. Specifically, as illustrated in FIG. 5, the step base 22 is fixedly connected to the step 1, and the step base 22 is pivotably connected to a lower end of the arm assembly 23.

In some embodiments, the lifting device 2 further includes a mounting base 21 and a step base 22. The mounting base 21 is adapted to be mounted to the bottom surface 210 of the vehicle body. The step 1 is mounted to the step base 22. The arm assembly 23 is pivotably connected to the mounting base 21 and the step base 22. Specifically, an upper end of the arm assembly 23 is pivotably connected to the mounting base 21, a top surface of the mounting base 21 is fixedly connected to the bottom surface 210 of the vehicle body, a lower end of the arm assembly 23 is pivotably connected to the step base 22, and the step 1 is fixedly connected to the step base 22.

In some embodiments, the arm assembly 23 includes a plurality of pairs of arms, and each pair of arms includes a first arm 231 and a second arm 232. A first end of the first arm 231 (a lower end of the first arm 231 in FIGS. 5 and 6) and a first end of the second arm 232 (an upper end of the second arm 232 in FIGS. 5 and 6) are connected to the driver 3, and a second end of the first arm 231 (an upper end of the first arm 231 in FIGS. 5 and 6) is pivotably connected to the mounting base 21, and a second end of the second arm 232 (a lower end of the second arm 232 in FIGS. 5 and 6) is pivotably connected to the step base 22. As illustrated in FIGS. 5-12, one first arm 231 and one second arm 232 constitute a pair of arms, and the plurality of pairs of arms are arranged at intervals in a left-right direction. The upper end of the first arm 231 is pivotably connected to the mounting base 21, the lower end of the first arm 231 and the upper end of the second arm 232 are connected to the driver 3, and the lower end of the second arm 232 is pivotably connected to the step base 22.

Specifically, when the linear driver is retracted, at least one of the first arm 231 and the second arm 232 rotates in a direction of being folded together towards each other, so that the step base 22 drives the step 1 to move closer to the mounting base 21 and the bottom surface 210 of the vehicle body to increase the height of the step 1. When the linear driver is extended, at least one of the first arm 231 and the second arm 232 can rotate in a direction of being unfolded relative to each other from being folded together, so that the step base 22 drives the step 1 to move away from the mounting base 21 and the bottom surface 210 of the vehicle body to reduce the height of the step 1.

Specifically, the mounting base 21 includes a first side wall 211 and a second side wall 212 spaced apart in the front-rear direction, and a first U-shaped groove 213 is formed between the first side wall 211 and the second side wall 212. The upper end of the first arm 231 is arranged in the first U-shaped groove 213, and a first pin shaft 233 passes through the upper end of the first arm 231 in the front-rear direction. A rear end of the first pin shaft 233 is pivotably connected to the first side wall 211, and a front end of the first pin shaft 233 is pivotably connected to the second side wall 212, so that the upper end of the first arm 231 is pivotably connected to the mounting base 21 through the first pin shaft 233.

The step base 22 includes a third side wall 221 and a fourth side wall 222 spaced apart in the front-rear direction, and a second U-shaped groove 223 is formed between the third side wall 221 and the fourth side wall 222. The lower end of the second arm 232 is arranged in the second U-shaped groove 223, and a second pin shaft 234 passes through the lower end of the second arm 232 in the front-rear direction. A rear end of the second pin shaft 234 is pivotably connected to the third side wall 221, and a front end of the second pin shaft 234 is pivotably connected to the fourth side wall 222, so that the lower end of the second arm 232 is pivotably connected to the step base 22 through the second pin shaft 234.

In some embodiments, the step apparatus 100 for the vehicle 1000 further includes a connecting assembly 5, and the connecting assembly 5 includes a first connecting plate 51 and a second connecting plate 52. The first connecting plate 51 and the second connecting plate 52 are connected to each other and arranged opposite to each other. The first end of the first arm 231 of each pair of arms is pivotably connected to the first connecting plate 51 and the second connecting plate 52, and the first end of the second arm 232 of each pair of arms is pivotably connected to the first connecting plate 51 and the second connecting plate 52. The driver 3 is connected to the first connecting plate 51 and the second connecting plate 52.

As illustrated in FIGS. 6, 8, 10, and 12, the first connecting plate 51 and the second connecting plate 52 extend substantially in the left-right direction, and the first connecting plate 51 and the second connecting plate 52 are spaced apart and arranged oppositely in the front-rear direction. The lower end of the first arm 231 of each pair of arms is pivotably connected to the first connecting plate 51 and the second connecting plate 52, and the upper end of the second arm 232 of each pair of arms is pivotably connected to the first connecting plate 51 and the second connecting plate 52. An end of the driver 3 is arranged between the first connecting plate 51 and the second connecting plate 52. A front end of a connecting shaft 235 is connected to the first connecting plate 51, and a rear end of the connecting shaft 235 passes through the end of the driver 3 to be connected to the second connecting plate 52.

In some embodiments, as illustrated in FIGS. 5-13, the plurality of pairs of arms include at least one driving arm pair 201. The first end of the first arm 231 of the driving arm pair 201 (the lower end of the first arm 231 of the driving arm pair 201 in FIG. 5) and the first end of the second arm 232 of the driving arm pair 201 (the upper end of the second arm 232 of the driving arm pair 201 in FIG. 5) are connected by a gear transmission, so that the first arm 231 and the second arm 232 of the driving arm pair 201 move synchronously.

In some specific embodiments, as illustrated in FIGS. 5-12, the step apparatus 100 for the vehicle 1000 further includes at least one gear box 4 corresponding to the driving arm pair. The gear box 4 includes a housing 41, a first gear arm 42, and a second gear 43. The housing 41 is arranged between the first connecting plate 51 and the second connecting plate 52, and the first gear 42 and the second gear 43 are mounted in the housing 41 and mesh with each other. The first end of the first arm 231 of the driving arm pair 201 (the lower end of the first arm 231 of the driving arm pair 201 in FIG. 5) is connected to a gear shaft of the first gear 42, and the first end of the second arm 232 of the driving arm pair 201 (the upper end of the second arm 231 of the driving arm pair 201 in FIG. 5) is connected to a gear shaft of the second gear 43.

As illustrated in FIGS. 5-12, the plurality of pairs of arms include at least one driving arm pair 201, and the first arm 231 and the second arm 232 of the driving arm pair 201 are connected by gears. Specifically, the housing 41 in which the first gear 42 and the second gear 43 are mounted is clamped between the first connecting plate 51 and the second connecting plate 52. The gear shaft of the first gear 42 extends from the first connecting plate 51 and the second connecting plate 52 to be connected to the lower end of the first arm 231 of the driving arm pair 201, the gear shaft of the second gear 43 extends from the first connecting plate 51 and the second connecting plate 52 to be connected to the upper end of the second arm 232, and the first gear 42 and the second gear 43 mesh with each other. Therefore, the housing 41 is driven to move when the driver 3 drives the first connecting plate 51 and the second connecting plate 52 to move, and under the action of the first gear 42 and the second gear 43, the first arm 231 and the second arm 232 can keep a synchronous movement, i.e., both rotate in a direction of being folded together towards each other, or both rotate in a direction of moving away from each other to be unfolded.

In some specific embodiments, at least two driving arm pairs 201 are provided, one of which is a first driving arm pair and the other of which is a second driving arm pair. At least two gear boxes 4 are provided, one of which is a first gear box and the other of which is a second gear box. The first gear box corresponds to the first driving arm pair, and the second gear box corresponds to the second driving arm pair. The connecting assembly 5 includes a first connecting assembly 501 and a second connecting assembly 502. The housing 41 of the first gear box is arranged between one end of the first connecting plate 51 of the first connecting assembly 501 and one end of the second connecting plate 52 of the first connecting assembly 501, and the other end of the first connecting plate 51 of the first connecting assembly 501 and the other end of the second connecting plate 52 of the first connecting assembly 501 are connected to a first end 31 of the driver 3. The housing 41 of the second gear box is arranged between one end of the first connecting plate 51 of the second connecting assembly 502 and one end of the second connecting plate 52 of the second connecting assembly 502, and the other end of the first connecting plate 51 of the second connecting assembly 502 and the other end of the second connecting plate 52 of the second connecting assembly 502 are connected to a second end 32 of the driver 3.

As illustrated in FIGS. 5-12, two driving arm pairs 201 are provided, and the two driving arm pairs 201 are arranged at intervals in the left-right direction. Two gear boxes 4 are provided, and the two gear boxes 4 are arranged at intervals in the left-right direction. Two connecting assemblies 5 are provided, namely, the first connecting assembly 501 and the second connecting assembly 502 arranged at intervals in a direction from left to right. The first end 31 and the second end 32 of the driver 3 are oppositely arranged in the direction from left to right.

A right end of the first connecting plate 51 of the first connecting assembly 501 and a right end of the second connecting plate 52 of the first connecting assembly 501 are connected to the first end 31 of the driver 3. The housing 41 of one gear box 4 is arranged between a left end of the first connecting plate 51 of the first connecting assembly 501 and a left end of the second connecting plate 52 of the first connecting assembly 501. The first gear 42 of the one gear box 4 is connected to the lower end of the first arm 231 of one driving arm pair 201, and the second gear 43 of the one gear box 4 is connected to the upper end of the second arm 232 of the one driving arm pair 201. A left end of the first connecting plate 51 of the second connecting assembly 502 and a left end of the second connecting plate 52 of the second connecting assembly 502 are connected to the second end 32 of the driver 3. The housing 41 of the other gear box 4 is arranged between a right end of the first connecting plate 51 of the second connecting assembly 502 and a right end of the second connecting plate 52 of the second connecting assembly 502. The first gear 42 of the other gear box 4 is connected to the lower end of the first arm 231 of the other driving arm pair 201, and the second gear 43 of the other gear box 4 is connected to the upper end of the second arm 232 of the other driving arm pair 201.

Figure 13:
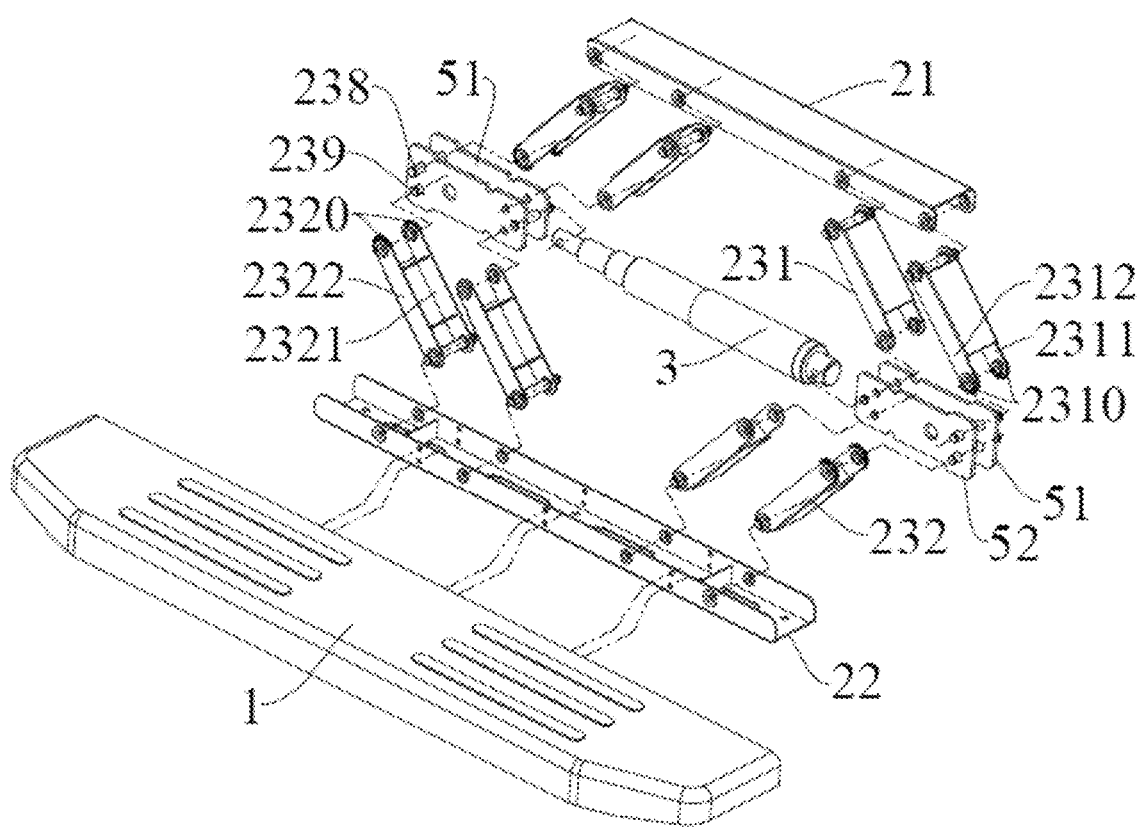
FIG. 13 is an exploded view of a step apparatus for a vehicle according to yet another embodiment of the present disclosure.

The gear transmission between the first arm 231 and the second arm 232 of the driving arm pair 201 is not limited to the form of the gear box 4 illustrated in FIGS. 5-12. For example, in other specific embodiments, as illustrated in FIG. 13, the first end of the first arm 231 of the driving arm pair 201 is provided with a plurality of first gear teeth 2310, the first end of the second arm 232 of the driving arm pair 201 is provided with a plurality of second gear teeth 2320, and the first gear teeth 2310 and the second gear teeth 2320 mesh with each other. Thus, the plurality of gear teeth at the first end of the first arm 231 mesh with the plurality of gear teeth at the first end of the second arm 232 to realize the synchronization movement of the first arm 231 and the second arm 232 of the driving arm pair 201.

In some specific embodiments, as illustrated in FIG. 13, in the driving arm pair 201, the first arm 231 includes a first side plate 2311 and a second side plate 2312 arranged opposite to each other and spaced apart, and the second arm 232 includes a first side plate 2321 and a second side plate 2322 arranged opposite to each other and spaced apart. A first end of the first side plate 2311 of the first arm (a lower end of the first side plate 2311 of the first arm of the driving arm pair 201 in FIG. 13) and a first end of the first side plate 2321 of the second arm (an upper end of the first side plate 2321 of the second arm of the driving arm pair 201 in FIG. 13) are pivotably connected to the first connecting plate 51. A first end of the second side plate 2312 of the first arm (a lower end of the second side plate 2312 of the first arm of the driving arm pair 201 in FIG. 13) and a first end of the second side plate 2322 of the second arm (an upper end of the second side plate 2322 of the second arm of the driving arm pair 201 in FIG. 13) are pivotably connected to the second connecting plate 52.

The lower end of the first side plate 2311 and the lower end of the second side plate 2312 of the first arm are each provided with a plurality of first gear teeth 2310, and the upper end of the first side plate 2321 and the upper end of the second side plate 2322 of the second arm are each provided with a plurality of second gear teeth 2320. The first gear teeth 2310 of the first side plate 2311 of the first arm mesh with the second gear teeth 2320 of the first side plate 2321 of the second arm, and the first gear teeth 2310 of the second side plate 2312 of the first arm mesh with the second gear teeth 2320 of the second side plate 2322 of the second arm.

As illustrated in FIG. 13, in the driving arm pair 201, the first side plate 2311 and the second side plate 2312 of the first arm are pivotably connected to the first connecting plate 51 and the second connecting plate 52, respectively, through a fifth pin shaft 238. Specifically, the fifth pin shaft 238 extends in the front-rear direction and passes through the first connecting plate 51 and the second connecting plate 52, a rear end of the fifth pin shaft 238 extends out of the first connecting plate 51 and is pivotably connected to the lower end of the first side plate 2311 of the first arm, and a front end of the fifth pin shaft 238 extends out of the second connecting plate 52 and is pivotably connected to the lower end of the second side plate 2312 of the first arm.

The first side plate 2321 and the second side plate 2322 of the second arm are pivotably connected to the first connecting plate 51 and the second connecting plate 52, respectively, through a sixth pin shaft 239. Specifically, the sixth pin shaft 239 extends in the front-rear direction and passes through the first connecting plate 51 and the second connecting plate 52, a rear end of the sixth pin shaft 239 extends out of the first connecting plate 51 and is pivotably connected to the upper end of the first side plate 2321 of the second arm, and a front end of the sixth pin shaft 239 extends out of the second connecting plate 52 and is pivotably connected to the upper end of the second side plate 2322 of the second arm.

Specifically, the fifth pin shaft 238 and the sixth pin shaft 239 are opposed to and spaced apart from each other in the up-down direction.

In some embodiments, the plurality of pairs of arms further include a driven arm pair 202, and the driven arm pair 202 and the driving arm pair 201 are spaced apart in the left-right direction. As illustrated in FIGS. 5, 6, 9, and 10, the plurality of pairs of arms include at least one driven arm pair 202, and the driven arm pair 202 is located between adjacent driving arm pairs 201.

The lower ends of the first arm 231 of the driven arm pair 202 straddle between the first connecting plate 51 and the second connecting plate 52. A third pin shaft 236 extends in the front-rear direction; a front end of the third pin shaft 236 is pivotably connected to one lower end of the first arm 231 of the driven arm pair 202 and the first connecting plate 51, and a rear end of the third pin shaft 236 is pivotably connected to the other lower end of the first arm 231 of the driven arm pair 202 and the second connecting plate 52, so that the lower ends of the first arm 231 of the driven arm pair 202 are pivotably connected to the first connecting plate 51 and the second connecting plate 52 through the third pin shaft 236. The upper ends of the second arm 232 of the driven arm pair 202 straddle between the first connecting plate 51 and the second connecting plate 52. A fourth pin shaft 237 extends in the front-rear direction; a front end of the fourth pin shaft 237 is pivotably connected to one upper end of the second arm 232 of the driven arm pair 202 and the first connecting plate 51, and a rear end of the fourth pin shaft 237 is pivotably connected to the other upper end of the second arm 232 of the driven arm pair 202 and the second connecting plate 52, so that the upper ends of the second arm 232 of the driven arm pair 202 are pivotably connected to the first connecting plate 51 and the second connecting plate 52 through the fourth pin shaft 237.

Specifically, the third pin shaft 236 and the fourth pin shaft 237 are arranged at intervals in the up-down direction, and the connecting shaft 235 is spaced apart from the third pin shaft 236 and the fourth pin shaft 237 in the left-right direction.

As illustrated in FIGS. 5, 6, 9, 10, and 13, two driving arm pairs 201 are provided, and the two driving arm pairs 201 are spaced apart in the left-right direction. Two driven arm pairs 202 are provided, and the two driven arm pairs 202 are located between the two driving arm pairs 201 and are spaced apart in the left-right direction. The driving arm pairs 201 and the driven arm pairs 202 are spaced apart in the left-right direction. The driver 3 extends in the left-right direction.

The lower end of the first arm 231 of one of the driven arm pairs 202 is pivotably connected to the first connecting plate 51 and the second connecting plate 52 of the first connecting assembly 501 through the third pin shaft 236. The upper end of the second arm 232 of this driven arm pair 202 is pivotably connected to the first connecting plate 51 and the second connecting plate 52 of the first connecting assembly 501 through the fourth pin shaft 237. A left end of the driver 3 is connected to the first connecting plate 51 and the second connecting plate 52 of the first connecting assembly 501 through the connecting shaft 235. Specifically, the connecting shaft 235 is located on the right side of the third pin shaft 236 and the fourth pin shaft 237.

The lower end of the first arm 231 of the other driven arm pair 202 is pivotably connected to the first connecting plate 51 and the second connecting plate 52 of the second connecting assembly 502 through the other third pin shaft 236. The upper end of the second arm 232 of this driven arm pair 202 is pivotably connected to the first connecting plate 51 and the second connecting plate 52 of the second connecting assembly 502 through the other fourth pin shaft 237. A right end of the driver 3 is connected to the first connecting plate 51 and the second connecting plate 52 of the second connecting assembly 502 through the other connecting shaft 235. Specifically, the other connecting shaft 235 is located on the left side of the other third pin shaft 236 and the other fourth pin shaft 237.

In some embodiments, the first arm 231 and the second arm 232 of each pair of arms are arranged symmetrically. As illustrated in FIGS. 5-12, the arm assembly 23 has a center line extending in the left-right direction, and the first arm 231 and the second arm 232 of each pair of arms are arranged symmetrically with respect to the center line.

In some embodiments, the first arm 231 and the second arm 232 of each pair of arms are inclined from the driver 3 to an inner side or an outer side of the arm assembly 23. As illustrated in FIGS. 5-8, the joint between the upper end of the first arm 231 and the mounting base 21 is located at an inner side of the joint between the lower end of the first arm 231 and the gear box 4. Specifically, the first arm 231 rotates clockwise downwards, and the second arm 232 rotates counterclockwise upwards, so as to realize the folding of the first arm 231 and the second arm 232. The first arm 231 rotates counterclockwise upwards, and the second arm 232 rotates clockwise downwards, so as to realize the unfolding of the first arm 231 and the second arm 232.

As illustrated in FIGS. 9-12, the joint between the upper end of the first arm 231 and the mounting base 21 is located at an outer side of the joint between the lower end of the first arm 231 and the gear box 4. Specifically, the first arm 231 rotates counterclockwise downwards, and the second arm 232 rotates clockwise upwards, so as to realize the folding of the first arm 231 and the second arm 232. The first arm 231 rotates clockwise upwards, and the second arm 232 rotates counterclockwise downwards, so as to realize the unfolding of the first arm 231 and the second arm 232.

Reference throughout this specification to "an embodiment," "some embodiments," "an example," "a specific example," or "some examples" means that a particular feature, structure, material, or characteristic described in connection with the embodiment or example is included in at least one embodiment or example of the present disclosure. Thus, the appearances of phrases such as "in some embodiments," "in one embodiment," "in an example," "in a specific example," or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, those skilled in the related art may combine and incorporate different embodiments or examples and their features described in the specification, without mutual contradictions.

In the present disclosure, unless specified or limited otherwise, a structure in which a first feature is "on" or "below" a second feature may include an embodiment in which the first feature is in direct contact with the second feature and may also include an embodiment in which the first feature is in indirect contact with the second feature through intermediaries. Furthermore, a first feature "on," "above," or "on top of" a second feature may include an embodiment in which the first feature is right "on," "above," or "on top of" the second feature and may also include an embodiment in which the first feature is diagonally "on," "above," or "on top of" the second feature, or such a phrase may just mean that the first feature is at a height higher than that of the second feature. A first feature "beneath," "below," or "on bottom of" a second feature may include an embodiment in which the first feature is right "beneath," "below," or "on bottom of" the second feature and may also include an embodiment in which the first feature is diagonally "beneath," "below," or "on bottom of" the second feature, or such a phrase may just mean that the first feature is at a height lower than that of the second feature.

In the descriptions, unless specified or limited otherwise, the terms "mounted," "connected," "coupled," and "fixed" and variations thereof should be understood broadly. For example, these may be permanent connections, detachable connections, or integrated connections; mechanical connections, electrical connections, or communicated with each other; direct connections or indirect connections through intermediaries; or intercommunication or interaction relationships of two elements, unless specified or limited otherwise. Those skilled in the related art may understand specific meanings of the above terms in the present disclosure according to specific situations.

Although explanatory embodiments have been illustrated and described, it would be appreciated by those skilled in the art that the above embodiments cannot be construed to limit the present disclosure, and changes, alternatives, and modifications can be made in the embodiments without departing from spirit, principles, and scope of the present disclosure.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A step apparatus for a vehicle, comprising:
   a step, having a side bar position and a jack position, wherein:
     in the side bar position, the step is located at a lower edge of a side face of a vehicle body of the vehicle, and
     in the jack position, the step abuts against a ground and is configured to jack up the vehicle body;
   a lifting device connected to the step and configured to be unfolded and folded to adjust a level of the step; and
   a driver connected to the lifting device and configured to drive the lifting device to be unfolded and folded.

2. The step apparatus according to claim 1, wherein the step further has a step position and wherein:
   in the step position, the step is located between the side bar position and the ground.

3. The step apparatus according to claim 1, wherein the lifting device comprises a foldable arm assembly, the arm assembly is pivotably connected to the step and a bottom surface of the vehicle body of the vehicle, and the driver is connected to the arm assembly to drive the arm assembly to be unfolded and folded.

4. The step apparatus according to claim 3, wherein the lifting device further comprises a mounting base and a step base, wherein the mounting base is configured to be mounted to the bottom surface of the vehicle body, the step is mounted to the step base, and the arm assembly is pivotably connected to the mounting base and the step base.

5. The step apparatus according to claim 1, wherein the driver is a linear driver.

6. The step apparatus according to claim 5, wherein the linear driver is a hydraulic cylinder, an air cylinder, or an electric push rod.

7. A step apparatus for a vehicle, comprising:
   a step;
   a lifting device connected to the step and configured to be unfolded and folded to adjust a level of the step; and
   a driver connected to the lifting device and configured to drive the lifting device to be unfolded and folded,
   wherein the lifting device comprises a foldable arm assembly, the arm assembly is pivotably connected to the step and a bottom surface of the vehicle body of the vehicle, and the driver is connected to the arm assembly to drive the arm assembly to be unfolded and folded,
   wherein the lifting device further comprises a mounting base and a step base, wherein the mounting base is configured to be mounted to the bottom surface of the vehicle body, the step is mounted to the step base, and the arm assembly is pivotably connected to the mounting base and the step base, and
   wherein the arm assembly comprises a plurality of pairs of arms, each pair of arms comprises a first arm and a second arm, a first end of the first arm and a first end of the second arm are connected to the driver, a second end of the first arm is pivotably connected to the mounting base, and a second end of the second arm is pivotably connected to the step base.

8. The step apparatus according to claim 7, further comprising a connecting assembly, wherein the connecting assembly comprises a first connecting plate and a second connecting plate, the first connecting plate and the second connecting plate are connected to each other and arranged opposite to each other, the first end of the first arm of each pair of arms is pivotably connected to the first connecting plate and the second connecting plate, the first end of the second arm of each pair of arms is pivotably connected to the first connecting plate and the second connecting plate, and the driver is connected to the first connecting plate and the second connecting plate.

9. The step apparatus according to claim 8, wherein the plurality of pairs of arms comprise at least one driving arm pair, a first end of a first arm of the driving arm pair and a first end of a second arm of the driving arm pair are connected by a gear transmission, so that the first arm and the second arm of the driving arm pair are configured to move synchronously.

10. The step apparatus according to claim 9, further comprising at least one gear box corresponding to the driving arm pair, wherein the gear box comprises a housing, a first gear, and a second gear, the housing is arranged between the first connecting plate and the second connecting plate, the first gear and the second gear are mounted in the housing and mesh with each other, the first end of the first arm of the driving arm pair is connected to a gear shaft of the first gear, and the first end of the second arm of the driving arm pair is connected to a gear shaft of the second gear.

11. The step apparatus according to claim 9, wherein the first end of the first arm of the driving arm pair is provided with a plurality of first gear teeth, the first end of the second arm of the driving arm pair is provided with a plurality of second gear teeth, and the first gear teeth mesh with the second gear teeth.

12. The step apparatus according to claim 11, wherein, in the driving arm pair, both the first arm and the second arm comprise a first side plate and a second side plate,
   wherein the first side plate and the second side plate are arranged opposite to and spaced apart from each other, a first end of the first side plate of the first arm and a first end of the first side plate of the second arm are pivotably connected to the first connecting plate, a first end of the second side plate of the first arm and a first end of the second side plate of the second arm are pivotably connected to the second connecting plate,
wherein the first end of the first side plate of the first arm and the first end of the second side plate of the first arm are each provided with a plurality of first gear teeth, the first end of the first side plate of the second arm and the first end of the second side plate of the second arm are each provided with a plurality of second gear teeth, the first gear teeth of the first side plate of the first arm mesh with the second gear teeth of the first side plate of the second arm, and the first gear teeth of the second side plate of the first arm mesh with the second gear teeth of the second side plate of the second arm.

13. The step apparatus according to claim 9, wherein the plurality of pairs of arms further comprise at least one driven arm pair, and the at least one driving arm pair and the at least one driven arm pair are arranged at intervals.

14. The step apparatus according to claim 8, wherein the connecting assembly comprises at least a first connecting assembly and a second connecting assembly, a first end of the driver is connected to the first connecting plate and the second connecting plate of the first connecting assembly, and a second end of the driver is connected to the first connecting plate and the second connecting plate of the second connecting assembly.

15. The step apparatus according to claim 7, wherein the first arm and the second arm of each pair of arms are arranged symmetrically.

16. The step apparatus according to claim 7, wherein the first arm and the second arm of each pair of arms are inclined from the driver to an inner side or an outer side of the arm assembly.

17. The step apparatus according to claim 7, wherein the step is structured to have different operation positions which include:
a side bar position at which the step is located at a lower edge of a side face of a vehicle body of the vehicle, and
a jack position at which the step abuts against a ground and is configured to jack up the vehicle body;
wherein the lifting device is configured to be driven by the driver to adjust the level of the step to be at the different operation positions.

18. The step apparatus according to claim 17, wherein the step further has a step position that is located between the side bar position and the ground to provide an intermediate step for a person to step on.

19. A vehicle, comprising:
a vehicle body; and
a step apparatus for the vehicle, comprising:
a step, having a side bar position and a jack position, wherein:
in the side bar position, the step is located at a lower edge of a side face of the vehicle body of the vehicle, and
in the jack position, the step abuts against a ground and is configured to jack up the vehicle body;
a lifting device connected to the step and configured to be unfolded and folded to adjust a level of the step; and
a driver connected to the lifting device and configured to drive the lifting device to be unfolded and folded,
wherein the step apparatus for the vehicle is mounted to a bottom surface of the vehicle body.

20. The vehicle according to claim 19, wherein the step further has a step position and wherein:
in the step position, the step is located between the side bar position and the ground.

21. The vehicle according to claim 19, wherein the lifting device comprises a foldable arm assembly, the arm assembly is pivotably connected to the step and the bottom surface of the vehicle body of the vehicle, and the driver is connected to the arm assembly to drive the arm assembly to be unfolded and folded.

22. The vehicle according to claim 21, wherein the lifting device further comprises a mounting base and a step base, wherein the mounting base is configured to be mounted to the bottom surface of the vehicle body, the step is mounted to the step base, and the arm assembly is pivotably connected to the mounting base and the step base.

* * * * *